US006386033B1

(12) United States Patent
Negoro

(10) Patent No.: US 6,386,033 B1
(45) Date of Patent: May 14, 2002

(54) ANGULAR VELOCITY SENSOR

(75) Inventor: Yasuhiro Negoro, Nagaokakyo (JP)

(73) Assignee: Murata Manufacturing Co., (JP)

( * ) Notice: Subject to any disclaimer, the term of this patent is extended or adjusted under 35 U.S.C. 154(b) by 0 days.

(21) Appl. No.: 09/332,458

(22) Filed: Jun. 14, 1999

(30) Foreign Application Priority Data

Jul. 10, 1998 (JP) .......................................... 10-211845

(51) Int. Cl.$^7$ ............................................... G01P 9/04
(52) U.S. Cl. ................................. 73/504.12; 73/504.14
(58) Field of Search ........................ 73/504.02, 504.04, 73/504.08, 504.12, 504.14, 504.15, 514.32

(56) References Cited

U.S. PATENT DOCUMENTS

| 5,359,893 A | * 11/1994 | Dunn | 73/504.12 |
| 5,635,640 A | 6/1997 | Geen | 73/504.12 |
| 5,728,936 A | * 3/1998 | Lutz | 73/504.12 |
| 5,945,599 A | * 8/1999 | Fujiyoshi et al. | 73/504.12 |
| 5,969,225 A | * 10/1999 | Kobayashi | 73/504.12 |

FOREIGN PATENT DOCUMENTS

| JP | 05-312576 | 11/1993 |
| JP | 5312576 | 11/1993 |
| JP | 09-318359 | 12/1997 |

* cited by examiner

Primary Examiner—Helen Kwok
(74) Attorney, Agent, or Firm—Ostrolenk, Faber, Gerb & Soffen LLP

(57) ABSTRACT

An angular velocity sensor includes: a board in the form of a flat plate; a rotational vibrator extended to the right and left from a central axis vertical to the board at the center of rotational vibration over the board and supported at the location of the central axis by rotational supporting beams so as to be rotationally vibrated; a first vibrator located on the left side of the rotational vibrator and supported by first supporting beams; a second vibrator located on the right side of the rotational vibrator and supported by second supporting beams; a rotational vibration generator for vibrating the second vibrator backward and forward when the first vibrator is vibrated forward and backward by giving rotational vibration to the rotational vibrator; a first displacement detector for detecting displacement of the first vibrator vibrated to the right and left when an angular velocity is applied around the central axis of the rotational vibrator in the state that rotational vibration is given to the rotational vibrator by the rotational vibration generator; and a second displacement detector for detecting displacement of the second vibrator vibrated to the right and left when an angular velocity is applied around the central axis of the rotational vibrator in the state that rotational vibration is given to the rotational vibrator by the rotational vibration generator.

16 Claims, 5 Drawing Sheets

ANGULAR VELOCITY SENSOR

BACKGROUND OF THE INVENTION

1. Field of the Invention

The present invention relates to an angular velocity sensor used to detect an angular velocity acting on, for example, a moving object, such as a rotor, etc.

2. Description of the Related Art

In general, an angular velocity sensor of conventional technology as described in Japanese Unexamined Patent Publication No. 5-312576 and other publications is known.

The angular velocity sensor described in this Japanese Unexamined Patent Publication No. 5-312576 is in substance composed of a board, first and second vibrators, vibration generating means, and displacement detecting means.

The first vibrator is supported on the board through first supporting beams and arranged so as to be vibrated in the direction of a first axis horizontal to the board. Further, the second vibrator is supported on the first vibrator through second supporting beams and arranged so as to be vibrated in the direction of a second axis at a right angle to the direction of the first axis and horizontal to the board. Because of this, the second vibrator is able to be vibrated in the direction of the first and second axes in the state that the second vibrator is kept horizontal to the board.

Further, the vibration generating means provides vibration in the direction of the first axis to the first vibrator. In this state, when an angular velocity is applied around a third axis at right angles to the first and second axes, that is, a rotational axis vertical to the board, the second vibrator is displaced in the direction of the second axis by a Coriolis force in proportion to the angular velocity. Because of this, the displacement detecting means detects a displacement of the second vibrator in the direction of the second axis to detect the angular velocity.

In the above angular velocity sensor of conventional technology, when acceleration is applied in the direction of the second axis, the second vibrator is displaced in the direction of the second axis by the acceleration. At this time, the displacement detecting means also detects the displacement of the second vibrator by such acceleration as the displacement caused by an angular velocity. That is, even if the whole sensor is not rotated around the third axis vertical to the board, the angular velocity detecting means detects the displacement of the second vibrator when acceleration is applied in the direction of the second axis.

In this way, when acceleration is applied in the direction of the second axis, because the displacement of the second vibrator produced by the acceleration is added as noise, there is a problem that the detection accuracy of angular velocity is degraded.

SUMMARY OF THE INVENTION

The present invention can solve the problem associated with the above-mentioned conventional technology, and provides an angular velocity sensor which is able to detect an angular velocity applied around the third axis even if acceleration has been applied in the direction of the second axis.

The angular velocity sensor comprises: a board in the form of a flat plate; a rotational vibrator extended to the right and left from the central axis vertical to the board as the center of rotational vibration over the board and supported at the location of the central axis by rotational supporting beams so as to be rotationally vibrated; a first vibrator located on a right side of the rotational vibrator and supported by first supporting beams, a second vibrator located on the left side of the rotational vibrator and supported by second supporting beams; rotational vibration generating means for vibrating the second vibrator backward and forward when the first vibrator is vibrated forward and backward by giving rotational vibration to the rotational vibrator; a first displacement detector for detecting a displacement of the first vibrator vibrated to the right and left when an angular velocity is applied around the central axis of the rotational vibrator in the state that rotational vibration is given to the rotational vibrator by the rotational vibration generating means, and a second displacement detector for detecting displacement of the second vibrator vibrated to the right and left when an angular velocity is applied around the central axis of the rotational vibrator in the state that rotational vibration is given to the rotational vibrator by the rotational vibration generating means.

As thus constructed, when the rotational vibration generating means gives rotational vibration to the rotational vibrator over the board and makes the first vibrator vibrate backward and forward, the second vibrator is vibrated forward and backward. And an angular velocity is applied to the whole sensor around the rotational axis of the rotational vibrator in the state that rotational vibration is given to the rotational vibrator, a Coriolis force in proportion to the angular velocity acts on the first and second vibrators. At this time, as the first vibrator is vibrated backward and forward and the second vibrator is vibrated forward and backward, the Coriolis force acting on the first and second vibrators is in reverse, and the first and second vibrators are vibrated symmetrical to the right and left with respect to the central axis of the rotational vibrator. That is, when the first vibrator is displaced toward one side to the right and left, the second vibrator is displaced toward the other side to the right and left.

And when a displacement of the first vibrator is detected by the first displacement detector, a displacement of the second vibrator toward the other side is detected by the second displacement detector. Because of this, by using signals from the first and second displacement detector, the angular velocity applied to the whole sensor is able to be detected.

More, when acceleration toward one side to the right and left is applied to the whole sensor, the first and second vibrators are made to be displaced toward the other side to the right and left by this acceleration because of the inertia of the first and second vibrators. In this state, if an angular velocity around the central axis of the rotational vibrator is applied to the whole sensor, for example, the displacement to the right and left of the first vibrator is increased, and the displacement of the first vibrator is made equal to the addition of the displacement due to angular velocity and the displacement due to acceleration. On the other hand, the displacement to the right and left of the second vibrator is reduced, the displacement of the second vibrator is made equal to the subtraction of the displacement due to angular velocity from the displacement due to acceleration. Because of this, by adding detection signals from the first and second displacement detectors, the detection signals due to acceleration offset each other and only the detection signals due to angular velocity is able to take out.

The rotational supporting beams may be arranged in a spiral form between a supporting portion given at the central axis on the board and the rotational vibrator. In this case, the rotational supporting beams are able to support the rotational vibrator so as to give rotational vibration around the central axis by the whole rotational supporting beams being bent and deformed.

The first vibrator and the second vibrator may be arranged so as to be symmetrical to the right and left with respect to the central axis. In the case, when rotational vibration is given to the rotational vibrator, the first and second vibrators are able to be symmetrically vibrated to the right and left at the same speed. Accordingly, when the first and second vibrators are displaced by an angular velocity, the measure of the displacement is made nearly equal. Therefore, the amplitude of signals by angular velocity is able to be made nearly equal in the signals from the first displacement detecting portion and second displacement detecting portion.

More, the spring constants of the first and second supporting beams may be set to be nearly equal and at the same time the mass of the first and second vibrators is set to be nearly equal. In the case when acceleration is applied in the direction of a tangential line of the rotational vibrator, the first and second vibrators are displaced by a nearly equal measure. Therefore, without carrying out various operations, the displacement capacitance by acceleration is easily offset by using displacement signals from the first and second displacement detectors.

The rotational vibrator may have frame portions in the form of a rectangular frame on both of the end sides to the right and left. More specifically, the first vibrator may be composed of a first vibrating portion in the form of the letter "H" given inside a first of the frame portions, and the second vibrator may be composed of a second vibrating portion in the form of the letter "H" given inside a second of the frame portions. The first displacement detector may be composed of a first vibrating side electrode given in the first vibrating portion and a first fixed side electrode arranged inside the first frame portion. The second displacement detector may be composed of a second vibrating side electrode given in the second vibrating portion and a second fixed side electrode arranged inside the second frame portion. In this case, when rotational vibration is given to the rotational vibrator, the first frame portion is vibrated backward and forward, and the second frame portion is vibrated forward and backward. Therefore, the first and second vibrating portions are vibrated backward and forward in the reverse direction from each other.

And the first vibrating side electrode and first fixed side electrode detect capacitance between these first vibrating side electrode and fixed side electrode, and detect the displacement measure to the right and left of the first vibrating portion. Further, the second vibrating side electrode and second fixed side electrode detect capacitance between these first vibrating side electrode and first fixed side electrode, and detect the displacement measure to the right and left of the second vibrating portion.

The rotational vibration generating means may comprises first and second vibration generators located on the side of one end to the right and left of the rotational vibrator, separated in the backward and forward direction of the rotational vibrator, and giving backward and forward vibration to a first vibrator, and of third and fourth vibration generators located on the side of the other end to the right and left of the rotational vibrator, separated in the backward and forward direction of the rotational vibrator, and giving backward and forward vibration to a second vibrator. When the first vibrator is displaced forward by input of driving signals of the same phase to the first and fourth vibration generators given at the locations symmetrical with respect to the central axis, the second vibrator is displaced backward, and when the first vibrator is displaced backward by input of driving signals of the same phase to the second and third vibration generators given at the locations symmetrical with respect to the central axis, the second vibrator is displaced forward.

Because thus constructed, the first through fourth vibration generators are able to give rotational vibration around the central axis to the rotational vibrator. And the first and fourth vibration generators are arranged so as to be symmetrical with respect to the central axis and are driven at the same time by driving signals of the same phase. Therefore, when the first vibrator is displaced forward by the first and fourth vibration generators, the second vibrator is able to be displaced backward.

Further, the second and third vibration generators are arranged so as to be symmetrical with respect to the central axis, and are driven at the same time by driving signals of the same phase. Therefore, when the first vibrator is displaced backward by the second and third vibration generators, the second vibrator is able to be displaced forward.

Other features and advantages of the present invention will become apparent from the following detailed description of the preferred embodiment (s) of the invention which refers to the accompanying drawings.

BRIEF DESCRIPTION OF THE DRAWING(S)

DETAILED DESCRIPTION OF THE PREFERRED EMBODIMENT(S)

Figure 1:
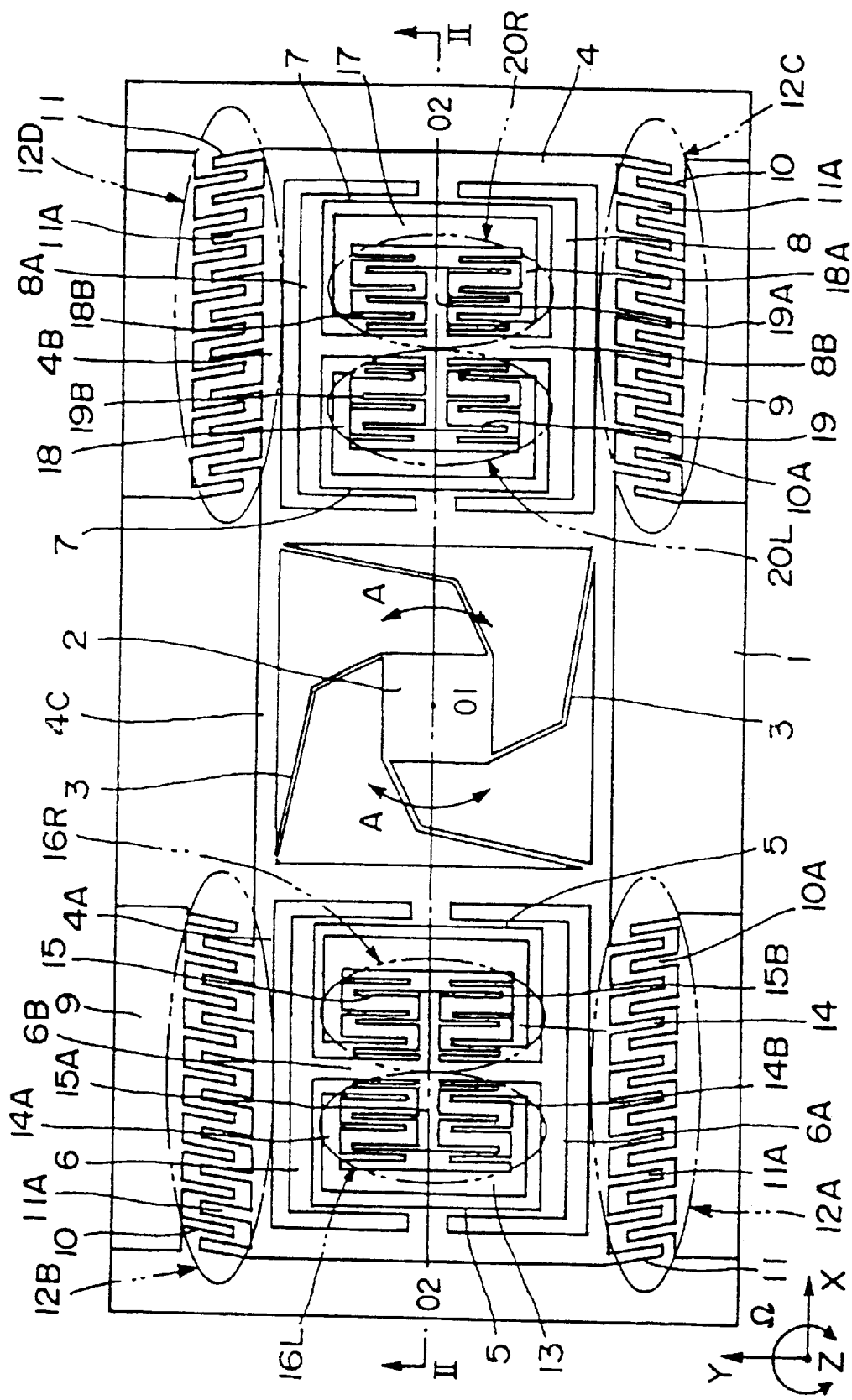
FIG. 1 is a front view of an angular velocity sensor according to an embodiment.

Hereinafter, the preferred embodiments of the present invention are explained in detail with reference to the drawings.

Numeral 1 represents a board in the form of a flat plate extended in the backward and forward direction and to the right and left which constitutes the base of an angular velocity sensor, and the board 1 is formed into a rectangular shape by using, for example, glass material. Here, for example, the backward and forward direction of the board 1 is set to be the direction of the Y axis and the direction to the right and left of the board 1 at a right angle to the direction of the Y axis is set to be the direction of the X axis. The direction perpendicular to the board 1 is set to be the direction of the Z axis.

Numeral 2 represents a supporting portion given nearly at the central location of the board 1. The supporting portion 2 is formed nearly in the shape of a rectangular solid and at the four corners of the supporting portion 2 the side of the base end of rotational supporting beams 3 to be described later is fixed. The supporting portion 2 is integrally formed together with a rotational vibrator 4 to be described later, first and second supporting beams 5, 7, first and second vibrators 6, 8 in the form of the letter "H", by using polysilicon, silicon single crystal, etc. doped with P, Sb, etc. and being of low resistance.

Numerals 3, 3, . . . represent four rotational supporting beams nearly spirally extended toward the outside of the board 1 from the supporting portion 2, and each of the rotational supporting beams 3 is provided between the supporting portion 2 and the rotational vibrator 4. And the side of the base end of each of rotational supporting beams is fixed at the four corners of the supporting portion 2 and at the same time the tip side is fixed at the rotational vibrator 4. Further, each of the rotational supporting beams 3 has a bent portion in the middle of the nearly spiral extension. And these four rotational supporting beams 3 support the rotational vibrator 4 so as to be horizontal to the board 1.

Numeral 4 represents a rotational vibrator supported by the rotational supporting beams 3 so as to be separated from the surface of the board 1, and the rotational vibrator 4 is formed so as to extend in the direction of the X axis from an axial line O1—O1 as the central axis perpendicular to the board 1 over the board 1. And the rotational vibrator 4 is supported by the rotational supporting beams 3 so as to be rotationally vibrated.

And the rotational vibrator 4 is composed of right and left frame portions 4A, 4B in the form of a rectangular frame having nearly a square form given on the side of both ends to the right and left (in the direction of the X axis) and a central frame portion 4C in the form of a rectangular frame having nearly a square form given between the frame portions 4A, 4B in the form of a rectangular frame, and is constructed nearly in the form of a ladder because of these frame portions 4A through 4C in the form of a rectangular frame.

Further, inside the central frame portion 4C in the form of a rectangular frame the supporting portion 2 is arranged and at the same time the tip side of each of the rotational supporting beams 3 is fixed at the corner portion of the frame portion 4C in the form of a rectangular frame. Because of this, the rotational vibrator 4 is fixed to the supporting portion 2 through the four rotational supporting beams 3 and is made to be rotationally vibrated around the axial line O1—O1 in the direction of an arrow A in FIG. 1 in the state that the rotational vibrator 4 is kept horizontal to the board 1. And the rotational vibrator 4 is rotationally vibrated at a resonance frequency determined by the mass of the rotational vibrator 4, the mass of the first and second vibrating portions 6, 8, and the spring constant of the rotational supporting beams 3.

Numerals 5, 5, . . . represent four first supporting beams and each of the supporting beams 5 is located inside the frame portion 4A in the form of a rectangular frame of the rotational vibrator 4 and is fixed to the middle of the side extended in the backward and forward direction (the direction of the Y axis) and extended in the direction of the Y axis. And the tip side of each of the supporting beams 5 is fixed to the first vibrating portion 6.

Numeral 6 represents a first vibrating portion in the form of the letter "H" as a first vibrator given inside the left frame portion 4A of the rotational vibrator 4, and the vibrating portion 6 is composed of two arm portions 6A extended in the direction of the X axis and connecting portions 6B connecting each of the arm portions 6A to nearly be in the form of the letter "H", and both end sides of each of the arm portions 6A are fixed to the tip side of each of the supporting beams 5. Because of this, the first vibrating portion 6 is fixed to the rotational vibrator 4 through the four supporting beams 5 so as to be vibrated in the direction of X axis. Further, to the connecting portion 6B of the first vibrating portion 6, first vibrating side detecting electrodes 15, 15 in the direction of X axis which are to be described later, are formed.

And the first vibrating portion 6 is to be vibrated at a resonance frequency f2 determined by the mass of the first vibrating portion 6 and the spring constant of the first supporting beams 5. Further, the resonance frequency f2 of the first vibrating portion 6 and the resonance frequency f1 of the rotational vibrator are set to be nearly equal to each other. Because of this, when a Coriolis force F acting on the first vibrating portion 6 is increased and an angular velocity Q is applied around the axial line O1—O1, the first vibrating portion 6 is able to be more displaced in the direction of the X axis.

Numerals 7, 7, . . . represent four second supporting beams, and each of the supporting beams 7, which is formed nearly in the same way as the first supporting beams 5, is located inside the frame portion 4B of the rotational vibrator 4, and is fixed to the middle of the side extended in the backward and forward direction (the direction of the Y axis) and extended in the direction of the Y axis. And the tip side of each of the supporting beams 7 is fixed to the second vibrating portion 8.

Numeral 8 represents a second vibrating portion in the form of the letter "H" as a second vibrator given inside the right frame portion 4B of the rotational vibrator 4, and the vibrating portion 8 is composed of two arm portions 8A extended in the direction of the X axis and connecting portions 8B connecting each of the arm portions 8A to be nearly in the form of the letter "H" nearly in the same way as the first vibrating portion 6, and both end sides of each of the arm portions 8A are fixed to the tip side of each of the supporting beams 7. Because of this, the second vibrating portion 8 is fixed to the rotational vibrator 4 through the four supporting beams 7 so as to be vibrated in the direction of the X axis. Further, to the connecting portion 8B of the second vibrating portion 8, second vibrating side detecting electrodes 19, 19 in the direction of the X axis, which are to be described later, are formed.

And out of the supporting portion 2, the first and second supporting beams 5, 7, and the first and second vibrating portions 5, 7, only the supporting portion 2 is mounted in a fixed condition on the board 1, and the first and second supporting beams 5, 7 and the first and second vibrating portions 6, 8 are horizontally supported a prescribed distance away from the board 1. Further, as each of the first supporting beams 5 is extended in the direction of the Y axis, by the first supporting beams 5 being bent in the direction of the X axis, the first vibrating portion 6 is able to be displaced in the direction of the X axis. Similarly, as each of the second supporting beams 7 is extended in the direction of the Y axis, by the second supporting beams 7 being bent in the direction of the X axis, the second vibrating portion 8 is able to be displaced in the direction of the X axis.

Further, the mass of the second vibrating portion 8 is set to be nearly equal to the mass of the first vibrating portion 6 and at the same time the spring constant of the second supporting beams 7 is set to be nearly equal to the spring constant of the first supporting beams 5. Because of this, the second vibrating portion 8 is to be vibrated at the resonance frequency f3 nearly equal to the resonance frequency f2 of the first vibrating portion 6.

When an angular velocity Ω is applied around the axial line O1—O1 in the state that the rotational vibrator 4 is rotationally vibrated, vibration of the second vibrating portion 8 and the first vibrating portion 6 is to be symmetrical in the direction of the X axis about the point determined by the axial line O1—O1.

Figure 2:
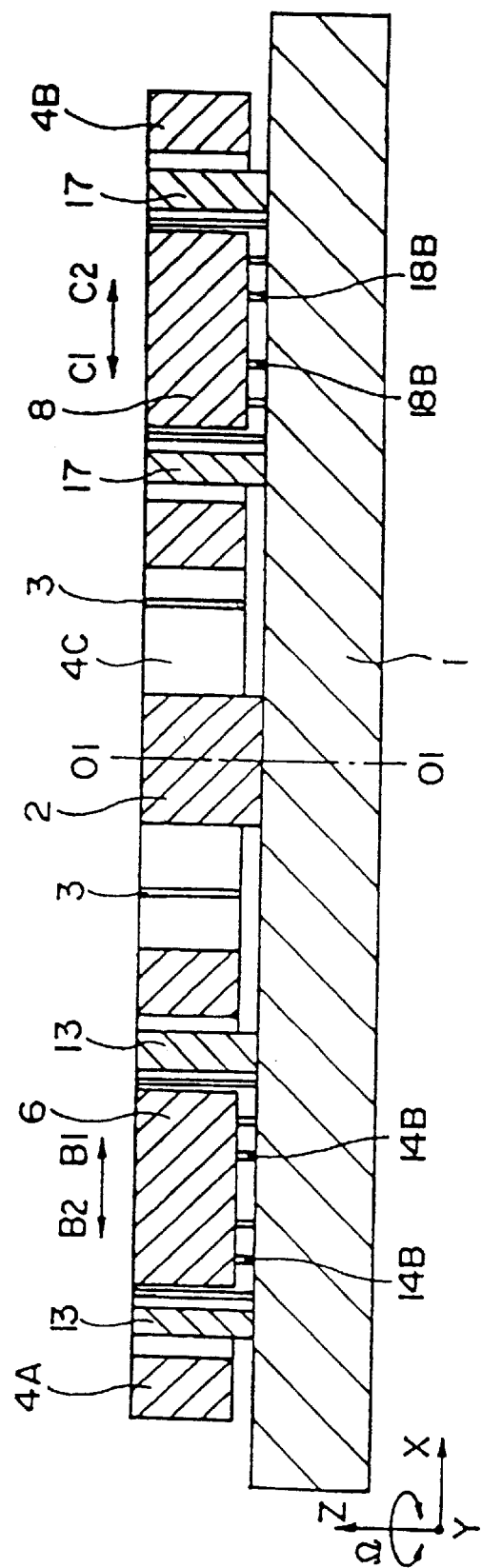
FIG. 2 is a vertical cross section taken on line II-II of FIG. 1.
Figure 4:
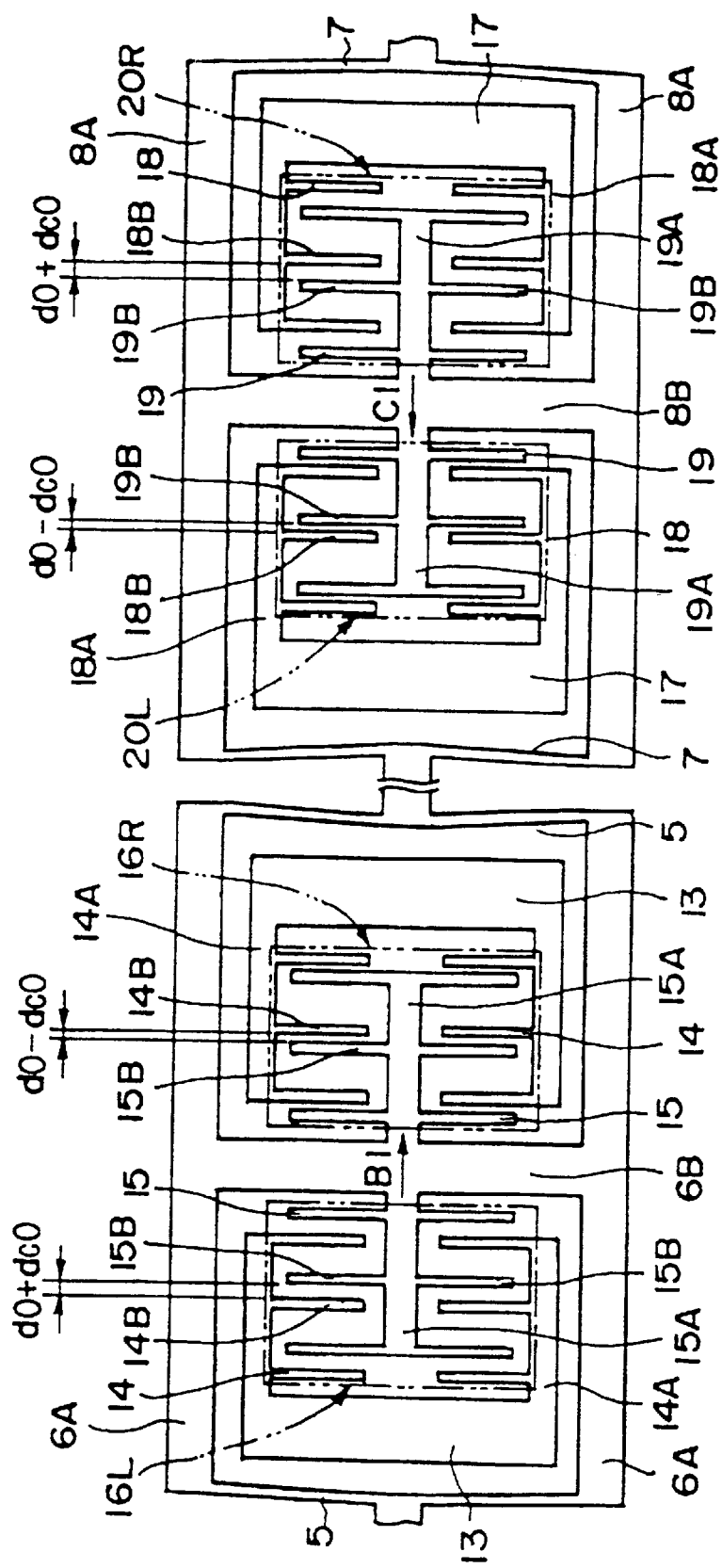
FIG. 4 is an enlarged front view of the state of first and second vibrating portions in the form of letter "H" and others at the time when an angular velocity is applied around an axial line O1—O1.

That is, referring to FIGS. 2 and 4, when the first vibrating portion 6 is displaced in the direction of an arrow B1 or toward the axial line O1—O1, the second vibrating portion 8 is also displaced in the direction of an arrow C1 or toward the axial line O1—O1. Further, the first vibrating portion 6 is displaced in the direction of an arrow B2 or away from the axial line O1—O1, the second vibrating portion 8 is also displaced in the direction of an arrow C2 or away from the axial line O1—O1.

As best seen in FIG. 1, numerals 9, 9, . . . represent four fixed portions for vibration given in the four corners on the board 1, and each of the fixed portions for vibration 9 is fixed on the board 1 so as to sandwich the frame portions 4A, 4B of the rotational vibrator 4.

Numerals 10, 10, . . . represent fixed side electrodes for vibration protruded toward the rotational vibrator 4 from the fixed portion for vibration 9, and each of the fixed side electrodes for vibration 10 is composed of nine electrode plates 10A protruded toward the fixed portion for vibration 9. Further, although each of the electrode plates 10A is extended along the rotational direction of the rotational vibrator 4, because it is given away from the axial line O2—O2 in the backward and forward direction (in the direction of the Y axis), it is a little tilted out of the direction of the Y axis. And each of the electrode plates 10A alternately faces each of the under-mentioned electrode plates 11A integrated into the rotational vibrator 4 with a gap between them.

Numerals 11, 11, . . . represent vibrating side vibrating electrodes formed on the rotational vibrator 4, and each of the vibrating side vibrating electrodes 11 is provided outside the frame portions 4A, 4B. And the vibrating side vibrating electrode 11 is composed of nine electrode plates 11A protruded toward the fixed portion for vibration in the backward and forward direction (in the direction of the Y axis). Further, the electrode plates 11A are extended in the rotational direction of the rotational vibrator 4 and are a little tilted out of the direction of the Y axis, and at the same time these electrode plates 11A are arranged in a combline form. And the vibrating side vibrating electrodes 11 and fixed side vibrating electrodes 10 constitute vibration generating portions 12A through 12D.

Numerals 12A, 12B, 12C, 12D represent vibration generating portions as rotational vibration generating means which are given at the four locations around the rotational vibrator 4, and each of the vibration generating portions 12A through 12D made up of the fixed side electrode for vibration 10 and vibrating side vibrating electrode 11 constitutes first through fourth vibration generators. And between each of the electrode plates 10A of the fixed side electrode for vibration 10 and each of the electrode plates 11A of the vibrating side vibrating electrode 11 an equal space is provided, respectively.

Further, out of the vibration generating portions 12A through 12D, the first and second vibration generating portions 12A, 12B are positioned away from each other in the backward and forward direction on the left-hand side of the rotational vibrator 4 and the third and fourth vibration generating portions 12C, 12D are positioned away from each other in the backward and forward direction on the right-hand side of the rotational vibrator 4.

Here, between the fixed side electrode for vibration 10 and vibrating side electrode 11, a driving signal such as a pulsed wave, a sine wave, etc. of frequency f0 is applied. At this time, between the electrode plates 10A, 11A positioned before and behind electrostatic attraction is periodically generated. Further, out of each of the vibration generating portions 12A through 12D to the first and fourth vibration generating portions 12A, 12D symmetrically positioned about the axial line O1—O1 a driving signal of the same phase is applied. On the other hand, to the second and third vibration generating portions 12B, 12C, a driving signal of the opposite phase to the driving signal to the vibration generating portions 12A, 12D is applied.

Because of this, when the frame portion 4A and the first vibrating portion 6 of the rotational vibrator 4 are displaced forward by the first and fourth vibration generating portions 12A, 12D, the vibration generating portion 12C is displaced backward by the frame portion 4B and the second vibrating portion 8. On the other hand, when the frame portion 4A and the first vibrating portion 6 of the rotational vibrator 4 are displaced backward by the second and third vibration generating portions 12B, 12C, the vibration generating portion 12C is displaced forward by the frame portion 4B and the second vibrating portion 8.

And as the rotational vibrator 4 repeats such movement, the vibration generating portions 12A through 12D provide rotational vibration around the axial line O1—O1 in the direction of an arrow A to the rotational vibrator 4, the first and second vibrating portions 6, 8, and other elements.

Numerals 13, 13 represent first detecting fixed portions provided inside the frame portion 4A of the rotational vibrator 4, and the detecting fixed portions 13 are directed away from each other in the right and left directions and are fixed on the board 1, and at the same time are provided in the space surrounded by the first supporting beams 5 and first vibrating portion 6.

Numerals 14, 14 represent first fixed side detecting electrodes as a first fixed side electrode provided in the detecting fixed portion 13, and each of the fixed side detecting electrodes 14 is composed of arm portions 14A extended to the right and left from both of the backward and forward sides of the detecting fixed portion 13 and six electrode plates 14B protruded inward from the arm portion 14A so that the electrode plates 14B alternately face each of the electrode plates 15B of a vibrating side detecting electrode 15 to be described later with spacing therebetween.

Numerals 15, 15 represent first vibrating side detecting electrodes as a first vibrating side electrode protruded to the right and left along the axial line O2—O2 extending in the direction of the X axis passing through the axial line O1—O1 from the center of the connecting portion 6B of the first vibrating portion 6, and each of the vibrating side detecting electrodes 15 is formed in the form of an antenna by an arm portion 15A extending in the direction of the X axis and six equally spaced electrode plates 15B extending in the backward and forward direction (in the direction of the Y axis) from the arm portion 15A. And the vibrating side detecting electrodes 15 and fixed side detecting electrodes 14 are to constitute first displacement detecting portions 16L, 16R to be described later.

Numerals 16L, 16R represent first displacement detecting portions located on the right and left as a first displacement detector, and each of the displacement detecting portions 16L, 16R is composed of the fixed side detecting electrode 14 and the vibrating side detecting electrode 15.

Figure 3:
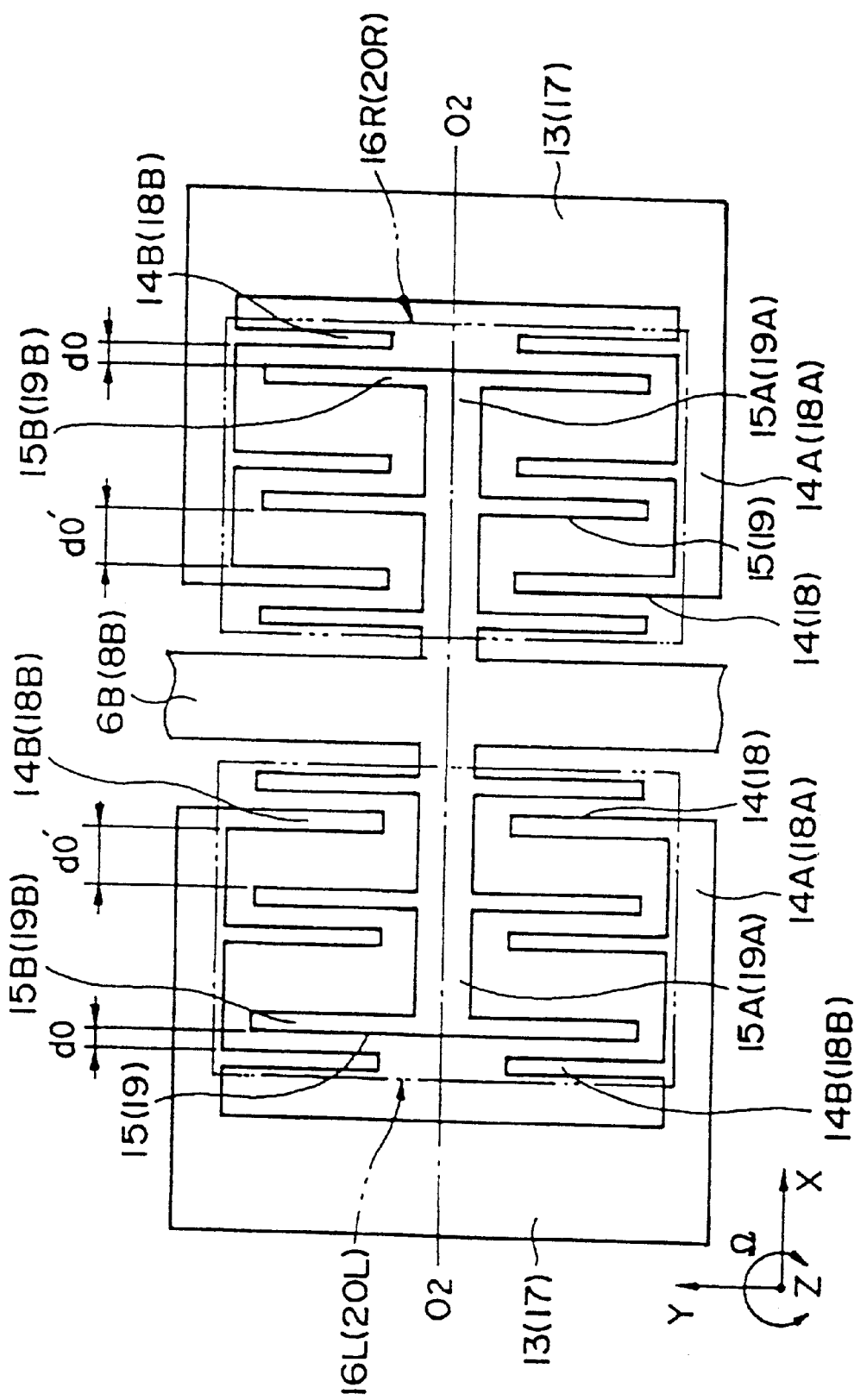
FIG. 3 is an enlarged front view of the state of first and second vibrating portions in the form of letter "H" and others at the start.

Further, each of the displacement detecting portions 16L, 16R is in the state shown in FIG. 3 at the start, and when the electrode plates 14B of the fixed side detecting electrode 14 are made to alternately face the electrode plates 15B of the vibrating side detecting electrode 15, the distance between the neighboring electrode plates 14B, 15B of the displacement detecting portion 16L on the left is set to be d0 of a narrow spacing and d0' of a wide spacing in an alternate way.

On the other hand, the displacement detecting portion 16R on the right is constructed in the same way as the displacement detecting portion 16L on the left, and the distance between the neighboring electrode plates 14B, 15B is set to be do of a narrow spacing and d0' of a wide spacing in an alternate way. And the distances d0, d0' between the electrode plates 14B, 15B of the displacement detecting portion 16L on the left and the distances do, do' between the electrode plates 14B, 15B of the displacement detecting portion 16R on the right are set to be symmetrical with respect to a line determined by the connecting portion 6B.

Because of this, the capacitance C0 at the start of a capacitor of parallel flat plates having a narrower spacing d0 therebetween and the capacitance C0' at the start of a capacitor of parallel flat plates having a wider spacing d0' therebetween have the relation as shown by the following formula 1.

$$C0 \gg C0' \qquad \text{[Formula 1]}$$

Because of this, at the start when the angular velocity sensor is not in operation, only the side having a narrower spacing d0 constitutes a parallel flat-plate capacitor. As a result, when an angular velocity $\Omega$ acts on the angular velocity sensor, each of the displacement detecting portions 16L, 16R detects the change of the spacing d0 between the electrode plates 14B, 15B as the change of the capacitance.

Numerals 17, 17 represent second detecting fixed portions provided inside the frame portion 4B of the rotational vibrator 4, and the detecting fixed portions 17 are directed away from each other in the right and left directions and are fixed on the board 1, and at the same time are provided in the space surrounded by the second supporting beams 7 and second vibrating portion 8.

Numerals 18, 18 represent second fixed side detecting electrodes as a second fixed side electrode provided in the detecting fixed portion 17, and each of the fixed side detecting electrodes 18 is composed of arm portions 18A extended to the right and left from both of the backward and forward sides of the detecting fixed portion 17 and six electrode plates 18B protruded inward from the arm portion 18A so that the electrode plates 18B alternately face each of the electrode plates 19B of a vibrating side detecting electrode 19 to be described later with a space therebetween.

Numerals 19, 19 represent second vibrating side detecting electrodes as a second vibrating side electrode protruded to the right and left along the axial line O2—O2 from the center of the connecting portion 8B of the second vibrating portion 8, and each of the vibrating side detecting electrodes 19 is formed in the shape of an antenna by arm portion 19A extending in the direction of the X axis and six equally spaced electrode plates 19B extending in the backward and forward direction (in the direction of the Y axis from the arm portion 19A. And the vibrating side detecting electrode 15 and fixed side detecting electrode 15 are to constitute second displacement detecting portions 20L, 20R to be described later.

Numerals 20L, 20R represent second displacement detecting portions located on the right and left as a second displacement detector, and each of the displacement detecting portions 20L, 20R is composed of the fixed side detecting electrode 18 and the vibrating side detecting electrode 19 nearly in the same way as the first displacement detecting portions 16L, 16R.

Further, each of the displacement detecting portions 20L, 20R is in the state shown in FIG. 3 at the start, and when the electrode plates 18B of the fixed side detecting electrode 18 are made to alternately face the electrode plates 19b of the vibrating side detecting electrode 19, the distance between the neighboring electrode plates 18B, 19B of the displacement detecting portion 20L on the left is set to be d0 of a narrow spacing and d0' of a wide spacing in an alternate way.

On the other hand, the displacement detecting portion 20R on the right is constructed in the same way as the displacement detecting portion 20L on the left, and the distance between the neighboring electrode plates 18B, 19B is set to be d0 of a narrow spacing and d0' of a wide spacing in a alternate way. And the distances d0, d0' between the electrode plates 18B, 19B of the displacement detecting portion 20L on the left and the distances d0, d0' between the electrode plates 18B, 19B of the displacement detecting portion 20R on the right are set to be symmetrical with respect to a line determined by the connecting portion 6B.

Because of this, in the second displacement detectors 20L, 20R, only the sides spaced by the distance d0 of a narrower spacing constitutes a parallel flat-plate capacitor as in the first displacement detectors 16L, 16R, and the capacitance C1 of the side spaced by the distance d0 is set to be nearly equal to the capacitance C0 of the first displacement detectors 16L, 16R. As a result, when an angular velocity $\Omega$ acts on the angular velocity sensor, each of the displacement detecting portions 20L, 20R detect the change of the distance d0 between the electrode plates 18B, 19B as the change of the capacitance.

An angular velocity sensor according to the present embodiment is constructed as described above. Next, the basic detecting operation at the time when an angular velocity $\Omega$ is applied around the axial line O1—O1 (the Z axis) is explained with reference to FIG. 4.

First, when driving signals are applied to the vibration generating portions 12A through 12D, between each of electrode plates 10A, 11A electrostatic attraction acts in an alternate way and the rotational vibrator 4 is rotationally vibrated around the axial line O1—O1.

At this time, the first and second vibrating portions 6, 8 are vibrated in the direction of the Y axis. Further, when the first vibrating portion 6 is displaced backward in the direction of the Y axis, the second vibrating portion 8 is displaced forward in the direction of the Y axis. On the other hand, the first vibrating portion 6 is displaced forward in the direction of Y axis, the second vibrating portion 8 is displaced backward in the direction of Y axis.

In this state, when an angular velocity $\Omega$ is applied around the axial line O1—O1, a Coriolis force shown by the following formula 2 is generated in the direction of the X axis.

$$F = 2 m \Omega v \qquad \text{[Formula 2]}$$

m: mass of the first and second vibrating portions 6, 8.
$\Omega$: angular velocity.
v: speed in the direction of Y axis of the first and second vibrating portions 6, 8.

And because of this Coriolis force, the first and second vibrating portions 6, 8 are vibrated in the direction of the X axis. At this time, the first displacement detecting portions 16L, 16R detect a vibration displacement of the first vibrating portion 6 as a change of capacitance between the fixed side detecting electrode 14 and the vibrating side detecting electrode 15 and output a displacement signal. Further, the second displacement detecting portions 20L, 20R detect a vibration displacement of the second vibrating portion 8 as the change of capacitance between the fixed side detecting electrode 18 and the vibrating side detecting electrode 19 and output a displacement signal. Because of this, by using the displacement signal from the first displacement detecting portions 16L, 16R and the displacement signal from the second displacement detecting portions 20L, 20R, an angular velocity Ω around the axial line O1—O1 is able to be detected.

Next, the method of operation of the displacement signal from the first displacement detecting portions 16L, 16R and the displacement signal from the second displacement detecting portions 20L, 20R at the time when an angular velocity Ω around the axial line O1—O1 is detected is explained.

First, the time when the first and second vibrating portions 6, 8 are displaced in the direction of an arrow B1 and an arrow C1 or to the right and left of the board 1 as shown in FIG. 4 is explained. Here, the distances d0, d0' between each of the electrode plates 14B, 15B of the first displacement detecting portions 16L, 16R are symmetrical with respect to a line determined by the connecting portion 6B. Because of this, out of the first displacement detecting portions 16L, 16R, in the left displacement detecting portion 16L, the distance d0 between the electrode plates 14B, 15B is increased by a distance of displacement of (+Δdc0). At this time, the left displacement detecting portion 16L outputs a displacement signal of a displacement capacitance of (−ΔCc0).

Here, a displacement measure of (+Δdc0) shows the difference in the spacing between the electrode plates 14B, 15B when the spacing is increased from the spacing d0 at the start by the displacement of the first vibrating portion 6 in the form of letter "H" because of Coriolis force. Further, a displacement capacitance of (−ΔCc0) shows the difference in capacitance when the spacing between the electrode plates 14B, 15B is increased by a displacement measure of (+Δdc0) and the capacitance between the electrode plates 14B, 15B is reduced from the capacitance C0 at the start.

On the other hand, in the displacement detecting portion 16R on the right of the connecting portion 6B, the spacing between the electrode plates 14B, 15B is reduced by a displacement measure of (−Δdc0). At this time, the displacement detecting portion 16R on the right outputs a displacement signal of (+ΔCc0). That is, when the first vibrating portion 6 is displaced to the left, the displacement measure and displacement capacitance of the displacement detecting portions 18L, 18R on the right and left are as shown in Table 1 below.

Here, a displacement distance of (−Δdc0) shows the difference in the spacing between the electrode plates 14B, 15B when the spacing is reduced from the spacing d0 at the start by the displacement of the first vibrating portion 6 because of Coriolis force. Further, a displacement capacitance of (+ΔCc0) shows the difference in capacitance when the spacing between the electrode plates 14B, 15B is reduced by a displacement measure of (−Δdc0) and the capacitance between the electrode plates 14B, 15B is increased from the capacitance C0 at the start.

Next, displacement signals by the second displacement detecting portions 20L, 20R are explained. Here, as the first and second vibration portions 6, 8 are vibrated in the opposite way from each other in the direction of the Y axis, the direction in which the Coriolis force acts on the second vibrating portion 8 is opposite to the direction in which the Coriolis force acts on the first vibrating portion 6. Because of this, when the first vibrating portion 6 is displaced in the direction of an arrow B1 or to the right of the board 1, the second vibration portion 8 is displaced in the direction of an arrow C1 or to the left of the board 1.

Further, the spring constants of the first and second supporting beams 5, 7 are set to be nearly equal to each other, and at the same time the mass of the first and second vibrating portions 6, 8 is set to be nearly equal. Because of this, the displacement measure at the time when the second vibrating portion 8 is displaced in the direction of an arrow C1 by the Coriolis force is made to be nearly equal to the displacement measure at the time when the first vibrating portion 6 is displaced in the direction of an arrow B1 by the Coriolis force.

Because of this, in the left displacement detecting portion 20L of the second displacement detecting portions 20L, 20R, the spacing d0 between the electrode plates 18B, 19B is reduced by a displacement measure of (−Δdc0). And the left displacement detecting portion 20L outputs a displacement signal of a displacement capacitance of (+ΔCc0).

On the other hand, in the right displacement detecting portion 20R, the spacing d0 between the electrode plates 18B, 19B is increased by a displacement measure of (+Δdc0). And the right displacement detecting portion 20R outputs a displacement signal of a displacement capacitance of (−ΔCc0). That is, when the first vibrating portion 6 is displaced in the direction of an arrow B1 and at the same time the second vibrating portion 8 is displaced in the direction of an arrow C1, the displacement measure and displacement capacitance of each of the displacement detecting portions 16L, 16R, 20L, 20R are as shown in the following Table 1.

TABLE 1

|  | Displacement measure | Displacement capacitance |
| --- | --- | --- |
| Left displacement detecting portion 16L | +Δdc0 | −ΔCc0 |
| Right displacement detecting portion 16R | −Δdc0 | +ΔCc0 |
| Left displacement detecting portion 20L | −Δdc0 | +ΔCc0 |
| Right displacement detecting portion 20R | +Δdc0 | −ΔCc0 |

And by subtracting a displacement signal of the left displacement detecting potion 16L from a displacement signal of the right displacement detecting portion 16R as shown in the following formula 3, a displacement signal of (2×ΔCc0) is able to be detected.

$$(2 \times \Delta Cc0) = +\Delta Cc0 - (-\Delta Cc0) \qquad \text{[Formula 3]}$$

Further, by subtracting a displacement signal of the right displacement detecting portion 20R from a displacement signal of the left displacement detecting portion 20L as shown in the following formula 4, a displacement signal of (2×ΔCc0) is able to be detected.

$$(2 \times \Delta Cc0) = +\Delta Cc0 - (-\Delta Cc0) \qquad \text{[Formula 4]}$$

And by adding these two displacement signals as shown in the following formula 5, a displacement signal of (4×ΔCc0) is able to be detected, and the detecting accuracy of an angular velocity Ω is able to be increased compared with detection of the change of capacitance, for example, only by the left displacement detecting portion 16L.

$$(4 \times \Delta Cc0) = (2 \times \Delta Cc0) + (2 \times \Delta Cc0) \quad \text{[Formula 5]}$$

More, the case in which the first and second vibrating portions 6, 8 are displaced in the direction of arrows B1, C1 by the Coriolis force F has been explained, but even if the first and second vibrating portions 6, 8 are displaced in the direction of arrows B2, C2, nearly the same displacement signal is able to be detected except that the sign of displacement capacitance is changed.

That is, the first displacement detecting portions 16L, 16R output displacement signals of displacement capacitance of $(+\Delta Cc0)$ and $(-\Delta Cc0)$, and the second displacement detecting portions 20L, 20R output displacement signals of displacement capacitance of $(-\Delta Cc0)$ and $(+\Delta Cc0)$. Because of this, by applying subtraction to these two displacement signals in the same way as in formula 3 and formula 4, a displacement signal of $\{2 \times (-\Delta Cc0)\}$ is able to be detected. And by adding these two displacement signals in the same way as in formula 5, a displacement signal of $\{4 \times (-\Delta Cc0)\}$ is able to be detected.

Next, detecting operation at the time when acceleration G is applied in the direction of the axial line O2—O2 with an angular velocity $\Omega$ applied around the axial line O1—O1 is explained with reference to FIG. 5.

First, driving signals are applied to the vibration generating portions 12A through 12D and the rotational vibrator 4 is rotationally vibrated. As a result, the first and second vibrating portions 6, 8. When an angular velocity $\Omega$ is applied around the axial line O1—O1 in this state, the first and second vibrating portions 6, 8 is vibrated in the direction of the X axis because of the Coriolis force.

Further, when, for example, an acceleration G to the right along the X axis acts on the whole of the angular velocity sensor, the first and second vibrating portions 6, 8 is displaced to the left along the X axis or in the opposite direction to the acceleration G. In this way, the Coriolis force due to the angular velocity $\Omega$ and the acceleration G are to act on the first and second vibrating portions 6, 8.

Figure 5:
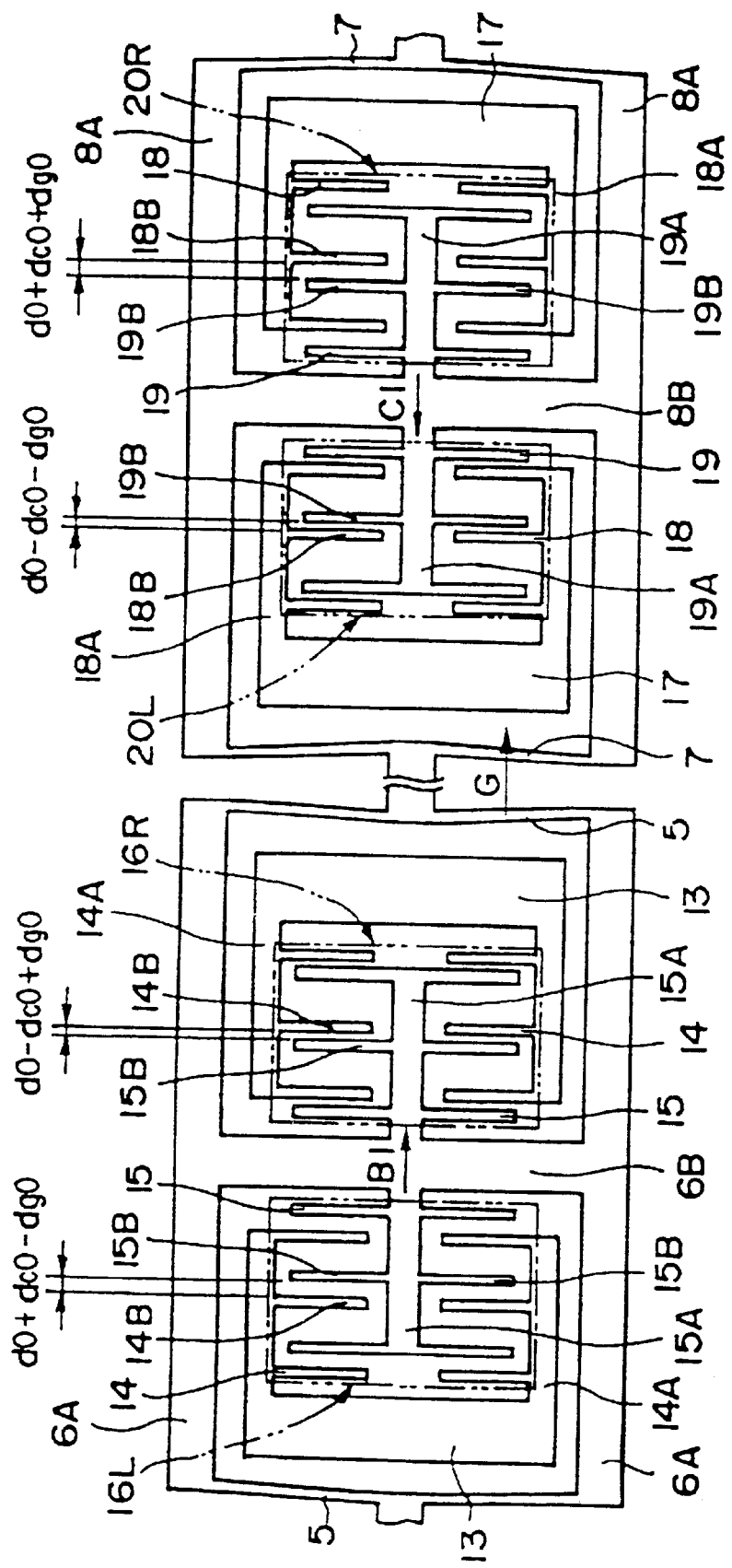
FIG. 5 is an enlarged front view of the state of first and second vibrating portions in the form of letter "H" and others at the time when acceleration G is applied in the direction of X axis with an angular velocity $\Omega$ applied around the axial line O1—O1.

Then, as shown in FIG. 5, the first and second vibrating portions 6, 8 displaced in the direction of arrows B1, C1 or to the right and left of the board 1 by the Coriolis force due to angular velocity $\Omega$ are explained.

As the first and second vibrating portions 6, 8 are displaced in the direction of arrows B1, C1 by angular velocity $\Omega$, in the left displacement detecting portion 16L of the first displacement detecting portions 16L, 16R, the spacing d0 between the electrode plates 14B, 15B is increased by a displacement measure $+\Delta dc0$ due to Coriolis force and the displacement signal is reduced by a displacement capacitance of $(-\Delta Cc0)$. Further, in the right displacement detecting portion 16R, the spacing d0 between the electrode plates 14B, 15B is reduced by a displacement distance of $(-\Delta dc0)$ due to the Coriolis force and the displacement signal is increased by a displacement capacitance of $(+\Delta Cc0)$.

On the other hand, in the left displacement detecting portion 20L out of the second displacement detecting portions 20L, 20R, the spacing between the electrode plates 18B, 19B is reduced by a displacement measure of $(-\Delta dc0)$ due to the Coriolis force and the displacement signal is increased by a displacement capacitance of $(+\Delta Cc0)$. More, in the right displacement detecting portion 20R the spacing d0 between the electrode plates 14B, 15B is increased by a displacement measure of $(+\Delta dc0)$ and the displacement signal is reduced by a displacement capacitance of $(-\Delta Cc0)$.

In addition, as both of the first and second vibrating portions 6, 8 are displaced in the direction of an arrow C1 by acceleration G, in the left displacement detecting portion 16L out of the first displacement detecting portions 16L, 16R, the spacing d0 between the electrode plates 14B, 15B is reduced by a displacement measure of $(-\Delta dg0)$ due to the acceleration G and the displacement signal is increased by a displacement capacitance of $(+\Delta Cg0)$. Further, in the right displacement detecting portion 16R the spacing d0 between the electrode plates 14B, 15B is reduced by a displacement measure of $(+\Delta dg0)$ and the displacement signal is reduced by a displacement capacitance of $(-\Delta Cg0)$.

Here, the displacement measure of $(-\Delta dg0)$ shows the difference of the spacing between the electrode plates 14B, 15B at the time when the first vibrating portion 6 is displaced by acceleration G and the spacing d0 at the start is reduced. And the displacement capacitance of $(+\Delta Cg0)$ shows the difference of capacitance between the electrode plates 14B, 15B at the time when the spacing between the electrode plates 14b, 15B is reduced by a displacement measure of $(-\Delta dg0)$ and the capacitance C0 between the electrode plates 14B, 15B at the start is increased.

Further, a displacement measure of $(+\Delta dg0)$ shows the difference of the spacing between the electrode plates 14B, 15B at the time when the first vibrating portion 6 is displaced by acceleration G and the spacing d0 at the start is increased. And the displacement capacitance of $(-\Delta Cg0)$ shows the difference of capacitance between the electrode plates 14B, 15B at the time when the spacing between the electrode plates 14B, 15B is increased by the displacement measure of $(+\Delta dg0)$ and the capacitance C0 between the electrode plates 14B, 15B at the start is increased.

On the other hand, in the left displacement detecting portion 20L out of the second displacement detecting portions 20L, 20R, the spacing d0 between the electrode plates 18B, 19B is reduced by a displacement measure of $(-\Delta dg0)$ due to the acceleration G, and the displacement signal is increased by a displacement capacitance of $(+\Delta Cg0)$. Further, in the right displacement detecting portion 16R, the spacing d0 between the electrode plates 14B, 15B is increased by a displacement measure of $(+\Delta dg0)$ due to the acceleration G, and the displacement signal is reduced by a displacement capacitance of $(-\Delta Cg0)$.

That is, when the first and second vibrating portions 6, 8 are displaced in the direction of arrows B1, C1 by an angular velocity $\Omega$ and the first and second vibrating portions 6, 8 are displaced in the direction of C1 by the acceleration G, the displacement measure and displacement capacitance of each of the displacement detecting portions 16L, 16R, 20L, 20R are as shown in the following Table 2.

TABLE 2

| | Displacement measure | Displacement capacitance |
|---|---|---|
| Left displacement detecting portion 16L | $+\Delta dc0 - \Delta dg0$ | $-\Delta Cc0 + \Delta Cg0$ |
| Right displacement detecting portion | $-\Delta dc0 + \Delta dg0$ | $+\Delta Cc0 - \Delta Cg0$ |
| Left displacement detecting portion 20L | $-\Delta dc0 - \Delta dg0$ | $+\Delta Cc0 + \Delta Cg0$ |
| Right displacement detecting portion | $+\Delta dc0 + \Delta dg0$ | $-\Delta Cc0 - \Delta Cg0$ |

And when a displacement signal of the left displacement detecting portion 16L is subtracted from a displacement signal of the right displacement detecting portion 16R as shown in the following formula 6, a displacement signal of $(2 \times \Delta Cc0 - 2 \times \Delta Cg0)$ is to be detected.

$$(2 \times \Delta Cc0 - 2 \times \Delta Cg0) = +\Delta Cc0 - \Delta Cg0 - (-\Delta Cc0 + \Delta Cg0) \quad \text{[Formula 6]}$$

Further, by subtracting a displacement signal of the right displacement detecting portion 20R from a displacement signal of the left displacement detecting portion 20L as shown in the following formula 7, a displacement signal of $(2 \times \Delta Cc0 + 2 \times \Delta Cg0)$ is able to be detected.

$$(2\times\Delta Cc0+2\times\Delta Cg0)=+\Delta Cc0+\Delta Cg0-(-\Delta Cc0-\Delta Cg0) \quad \text{[Formula 7]}$$

And by adding these two displacement signals as shown in the following formula 8, a displacement signal of (4×ΔCc0) is able to be detected, and by offsetting displacement signals (2×ΔCg0) based on acceleration G only a displacement signal (4×ΔCc0) based on an angular velocity Ω are able to be taken out.

$$(4\times\Delta Cc0)=(2\times\Delta Cc0+2\times\Delta Cg0)+(2\times\Delta Cc0-2\times\Delta Cg0) \quad \text{[Formula 8]}$$

Because of this, without being influenced by the acceleration G applied in the direction of X axis, only the displacement signals based on angular velocity Ω is able to be taken out and the detection accuracy of angular velocity Ω is able to be improved.

More, the case in which the first and second vibrating portions 6, 8 are displaced in the direction of arrows B1, C1 by the Coriolis force F has been explained, but even if the first and second vibrating portions 6, 8 are displaced in the direction of arrows B2, C2, nearly the same displacement signals are able to be detected except that the sign of displacement capacitance by angular velocity Ω is changed.

That is, the first displacement detecting portions 16L, 1GR output the displacement signals of displacement capacitance of (+ΔCc0+ΔCg0) and (−ΔCc0−ΔCg0), and the second displacement detecting portions 20L, 20R out put the displacement signals of displacement capacitance of (−ΔCc0+ΔCg0) and (+ΔCc0−ΔCg0). Because of this, by applying subtraction to the two displacement signals as in formula 6 and formula 7, the displacement signals of {2× (−ΔCc0)−2×ΔCg0} and {2×(−ΔCc0)+2×ΔCg0} are able to be detected. And by adding these two displacement signals as in formula 8, the displacement signal (2×ΔCg0) based on acceleration G is offset, and only the displacement signal {4×(−ΔCc0)} based on angular velocity Ω is able to be taken out.

Thus, in the present embodiment, the first and second vibrating portions 6, 8 to be vibrated in the direction of the X axis are provided on both sides of the rotational vibrator 4, and the first vibrating portion 6 includes the first displacement detecting portions 16L, 16R to detect displacement capacitance in the direction of the X axis of the first vibrating portion 6 and the second vibrating portion includes the second displacement detecting portions 20L, 20R to detect displacement capacitance in the direction of the X axis of the second vibrating portion 8. By using the displacement capacitance of the first vibrating portion 6 detected by the first displacement detecting portions 16L, 16R, the added signal of the displacement capacitance by angular velocity Ω and the displacement capacitance by the acceleration G is able to be detected. On the other hand, by using the displacement capacitance of the second vibrating portion 8 detected by the second displacement detecting portions 20L, 20R, the subtracted signal of the displacement capacitance by angular velocity Ω and the displacement capacitance by acceleration G is able to be detected.

Because of this, even if the first and second vibrating portions 6, 8 are displaced by angular velocity Ω and by an acceleration G in addition, by using the displacement signal detected by the first displacement detecting portions 16L, 16R and the displacement signal detected by the second displacement detecting portions 20L, 20R, the displacement capacitance by acceleration G is able to be offset. As a result, the detection sensitivity of angular velocity Ω is able to be improved.

Further, as the four rotational supporting beams 3 are spirally arranged between the supporting portion 2 given on the board 1 and the rotational vibrator 4, rotational vibration around the axial line O1—O1 is able to be provided to the rotational vibrator 4 by making each of the rotational supporting beams 3 as a whole bend.

Further, as the first vibrating portion 6 and are provided so as to be symmetrical in the direction of the X axis with respect to the axial line O1—O1, when rotational vibration is given to the rotational vibrator 4, the first vibrating portion 6 and the second vibrating portion 8 are able to be vibrated at the same speed nearly in the opposite direction from each other along the Y axis. As a result, when the first and second vibrating portions 6, 8 are displaced by angular velocity Ω, their displacement measure is made nearly equal. Because of this, in the displacement signal of the first displacement detecting portions 16L, 16R and the displacement signal of the second displacement detecting portions 20L, 20R, the amplitude of the signal brought about by angular velocity Ω is made nearly equal, and the detection accuracy of angular velocity Ω is able to be more improved than in the case that either of the displacement signals is smaller than the other.

Further, as the spring constant of the first and second supporting beams 5, 7 is set to be nearly equal and at the same time the mass of the first and second vibrating portions 6, 8 is set to be nearly equal, when acceleration G is applied in the direction of the X axis, the first vibrating portions 6 and the second vibrating portions 8 are nearly equally displaced. Because of this, without performing various calculations, by using the displacement signal of the first displacement detecting portions 16L, 16R and the displacement signal of the second displacement detecting portions 20L, 20R, the displacement capacitance by an acceleration G is able to be easily offset.

Further, the rotational vibrator 4 is composed of the frame portions 4A, 4B in the form of a rectangular frame given on the right and left sides of the rotational vibrator 4, the first and second vibrating portions 6, 8 in the form of letter "H" given inside the frame portions 4A, 4B in the form of a rectangular frame, the first displacement detecting portions 16L, 16R made up of the first vibrating side detecting electrode 15 given in the first vibrating portions 6, and the first fixed side detecting electrode 14 given on the board 1, and the second displacement detecting portions 20L, 20R made up of the second vibrating side detecting electrode 19 given in the second vibrating portions 8, and the second fixed side detecting electrode 18 given on the board 1. As a result, when the rotational vibrator 4 is rotationally vibrated, the first and second vibrating portions 6, 8 given inside the frame portions 4A, 4B are able to be vibrated backward and forward in the opposite direction from each other.

And by the first fixed side detecting electrode 14 and the first vibrating side detecting electrode 15, the capacitance between these electrode plates 14B, 15B is able to be detected to detect the amount of displacement of the first vibrating portions 6 in the direction of the X axis. Further, by the second fixed side detecting electrode 18 and the second vibrating side detecting electrode 19, the capacitance between these electrode plates 18B, 19B is able to be detected to detect the amount of displacement of the second vibrating portion 8 in the direction of the X axis.

In addition, when the first vibrating portions 6 is displaced forward by inputting driving signals of the same phase to the first and fourth vibration generating portions 12A, 12D, the second vibrating portion 8 is displaced backward. And at the same time the first vibrating portion 6 is displaced backward by inputting driving signals of the same phase to the second and third vibration generating portions 12B, 12C, the second vibrating portion 8 is displaced forward. As a result, the first through fourth vibration generating portions 12A through 12D are able to provide rotational vibration around the central axis to the rotational vibrator and to displace the first and second vibrating portions 6, 8 in the opposite direction from each other in the backward and forward direction (in the direction of the Y axis).

More, in the foregoing embodiment, the case in which the fixed side vibrating electrode 10 has nine electrode plates 10A and the vibrating side electrode 11 has nine electrode plates 11A was illustrated, but the invention is not so limited. More than nine electrode plates may be used and by increasing the number of electrode plates the driving force generated in the vibration generating portions 12A through 12D is able to be increased.

Further, in the foregoing embodiment, the case in which the first and second fixed side detecting electrodes 14, 18 have six electrode plates 14B, 18B and the first and second vibrating side detecting electrodes 15, 19 have six electrode plates 15B, 19B was illustrated, but the invention is not so limited. More than eight electrode plates may be used and by increasing the number of electrode plates the detection sensitivity in the displacement detecting portions 16L, 20L (16R, 20R) is able to be improved.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. An angular velocity sensor comprising:
    a board in the form of a flat plate;
    a rotational vibrator rotatable about a center axis of the board, the rotational vibrator being extended to the right and left along a first axis from a central axis vertical to the board and extending through the center thereof, the rotational vibrator being supported over the board at the location of the central axis by rotational supporting beams so as to be rotationally vibrated;
    a first vibrator located on a right side of the rotational vibrator along the first axis and spaced from the central axis and supported by first supporting beams;
    a second vibrator located on a left side of the rotational vibrator along the first axis and spaced from the central axis and supported by second supporting beams;
    rotational vibration generating means for vibrating the second vibrator backward and forward along a second axis direction transverse to the first axis when the first vibrator is vibrated forward and backward along the second axis direction by giving rotational vibration to the rotational vibrator;
    a first displacement detector for detecting a displacement of the first vibrator vibrated to the right and left when an angular velocity is applied around the central axis of the rotational vibrator in the state that rotational vibration is given to the rotational vibrator by the rotational vibration generating means; and
    a second displacement detector for detecting a displacement of the second vibrator vibrated to the right and left when an angular velocity is applied around the central axis of the rotational vibrator in the state that rotational vibration is given to the rotational vibrator by the rotational vibration generating means.

2. An angular velocity sensor according to claim 1, wherein the rotational supporting beams are spirally arranged between a supporting portion given at the location of the central axis on the board and the rotational vibrator.

3. An angular velocity sensor according to claim 1, wherein the first vibrator and second vibrator are at symmetrical locations of the rotational vibrator with respect to the central axis.

4. An angular velocity sensor according to claim 1, wherein a spring constant of the first supporting beams is set to be equal to a spring constant of the second supporting beams and the mass of the first vibrator is set to be substantially equal to the mass of the second vibrator.

5. An angular velocity sensor comprising:
    a board in the form of a flat plate;
    a rotational vibrator rotatable about a center of the board, the rotational vibrator being extended to the right and left from a central axis vertical to the board and extending through the center thereof and being supported over the board at the location of the central axis by rotational supporting beams so as to be rotationally vibrated;
    a first vibrator located on a right side of the rotational vibrator and supported by first supporting beams;
    a second vibrator located on a left side of the rotational vibrator and supported by second supporting beams;
    rotational vibration generating means for vibrating the second vibrator backward and forward when the first vibrator is vibrated forward and backward by giving rotational vibration to the rotational vibrator;
    a first displacement detector for detecting a displacement of the first vibrator vibrated to the right and left when an angular velocity is applied around the central axis of the rotational vibrator in the state that rotational vibration is given to the rotational vibrator by the rotational vibration generating means; and
    a second displacement detector for detecting a displacement of the second vibrator vibrated to the right and left when an angular velocity is applied around the central axis of the rotational vibrator in the state that rotational vibration is given to the rotational vibrator by the rotational vibration generating means, wherein the rotational vibrator has frame portions in the form of a rectangular frame on both the right and left sides of the rotational vibrator, the first vibrator including a first vibrating portion in the form of the letter "H" inside of a first one of the frame portions, the second vibrator including a second vibrating portion in the form of the letter "H" inside of a second one of the frame portions, the first displacement detector including a first vibrating side electrode provided in the first vibrating portion and a first fixed side electrode arranged inside of the first one of the frame portions and the second displacement detector including a second vibrating side electrode provided in the second vibrating portion and a second fixed side electrode arranged inside the second frame portions.

6. An angular velocity sensor according to claim 5, wherein the first fixed side electrode and the first vibrating side electrode are structured and arranged such that displacement of the first vibrator causes a change in a capacitance between the first fixed side electrode and the first vibrating side electrode, and wherein the second fixed side electrode and the second vibrating side electrode are structured and arranged such that displacement of the second vibrator causes a change in a capacitance between the second fixed side electrode and the second vibrating side electrode.

7. An angular velocity sensor according to claim 1, wherein the rotational vibration generating means are composed of first and second vibration generators located to the right of the rotational vibrator, separated in the backward and forward direction of the rotational vibrator, and providing backward and forward vibration to the first vibrator; and third and fourth vibration generators located on the right side of the rotational vibrator, separated in the backward and forward direction of the rotational vibrator, and providing backward and forward vibration to the second vibrator, the first, second, third and fourth vibrator generators being arranged such that when the first vibrator is displaced forward by input of driving signals of the same phase to the first and fourth vibration generators, the second vibrator is displaced backward, and that when the first vibrator is displaced backward by input of driving signals of the same phase to the second and third vibration generators, the second vibrator is displaced forward.

8. An angular velocity sensor comprising:

a support;

a rotational vibrator;

rotational support beams connected to the board and the rotational vibrator for supporting the rotational vibrator over the board at a central axis extending vertically from a center of the board;

a first vibrator located on a first side of the rotational vibrator along a first axis direction and supported by first supporting beams;

a second vibrator located on a second, opposite side of the rotational vibrator along the first axis and supported by second supporting beams;

a first vibrational generator for vibrating the first vibrator along a second axis direction transverse to the first axis direction and a second vibrational generator for vibrating the second vibrator along the second axis direction, the first and second vibrational generators causing the first and second vibrators to vibrate in opposite directions of the second axis direction to thereby vibrationally vibrate the rotational vibrator;

a first displacement detector for detecting a displacement of the first vibrator when both an angular velocity is applied around the central axis of the rotational vibrator and the rotational vibrator is rotationally vibrated; and a second displacement detector for detecting a displacement of the second vibrator when both an angular velocity is applied around the central axis of the rotational vibrator and the rotational vibrator is rotationally vibrated.

9. An angular velocity sensor according to claim 8, wherein the rotational support beams are spirally arranged between the board and the rotational vibrator.

10. An angular velocity sensor according to claim 8, wherein the first vibrator and the second vibrator are provided at symmetrical locations of the rotational vibrator in the right and left directions with respect to the central axis.

11. An angular velocity sensor according to claim 8, wherein a spring constant of the first supporting beams is equal to a spring constant of the second supporting beams and the mass of the first vibrator is set substantially equal to the mass of the second vibrator.

12. An angular velocity sensor according to claim 8, wherein the rotational vibrator has frame portions in the form of a rectangular frame on both the first and second sides.

13. An angular velocity sensor according to claim 12, wherein the first vibrator is shaped in the form of the letter "H" inside of a rectangular frame on the first side of the rotational vibrator and the second vibrator is shaped in the form of the letter "H" within a rectangular frame on the second side of the rotational vibration.

14. An angular velocity sensor comprising:

a support;

a rotational vibrator;

rotational support beams connected to the board and the rotational vibrator for supporting the rotational vibrator over the board at a central axis extending vertically from a center of the board;

a first vibrator located on a first side of the rotational vibrator and supported by first supporting beams;

a second vibrator located on a second, opposite side of the rotational vibrator and supported by second supporting beams;

a rotational vibration generator for rotationally vibrating the rotational vibrator, the rotational vibrator causing the first and second vibrators to vibrate;

a first displacement detector for detecting a displacement of the first vibrator when both an angular velocity is applied around the central axis of the rotational vibrator and the rotational vibrator is rotationally vibrated; and a second displacement detector for detecting a displacement of the second vibrator when both an angular velocity is applied around the central axis of the rotational vibrator and the rotational vibrator is rotationally vibrated, wherein the rotational vibrator has frame portions in the form of a rectangular frame on both the first and second sides, the first vibrator is shaped in the form of the letter "H" inside of the rectangular frame on the first side of the rotational vibrator, the second vibrator is shaped in the form of the letter "H" within the rectangular frame on the second side of the rotational vibration, the first displacement detector includes a first vibrating side electrode provided within the first vibrator and a first fixed side electrode arranged inside the rectangular frame of the first vibrator and the second displacement detector includes a second vibrating side electrode provided within the second vibrator and a second fixed side electrode arranged inside the rectangular frame of the second vibrator.

15. An angular velocity sensor according to claim 14, wherein the first fixed side electrode and the first vibrating side electrode are structured and arranged such that displacement of the first vibrator causes a change in a capacitance between the first fixed side electrode and the first vibrating side electrode, and wherein the second fixed side electrode and the second vibrating side electrode are structured and arranged such that displacement of the second vibrator causes a change in a capacitance between the second fixed side electrode and the second vibrating side electrode.

16. An angular velocity sensor according to claim 15, wherein the rotational vibration generator includes first and second vibration generating units located on the first side of the rotational vibrator and positioned to sandwich the rotational vibrator therebetween, and third and fourth vibration generating units located on the second side of the rotational vibrator and positioned to sandwich the rotational vibrator therebetween, the location and positioning of the first, second, third and fourth vibration generating units being such that when the first vibrator is displaced in a first direction by input of driving signals of the same phase to the first and fourth vibration generating units, the second vibrator is displaced in an opposite direction, and that when the first vibrator is displaced backward by input of driving signals of the same phase to the second and third vibration generating units, the second vibrator is displaced in the first direction.

* * * * *